US009994784B2

United States Patent
Chataing

(10) Patent No.: US 9,994,784 B2
(45) Date of Patent: Jun. 12, 2018

(54) REACTOR FOR GRINDING AND ROASTING BIOMASS, BIOMASS PROCESSING SYSTEM AND FACILITY INCORPORATING SUCH A REACTOR, AND ASSOCIATED METHOD

(71) Applicant: COMMISSARIAT A L'ENERGIE ATOMIQUE ET AUX ENE ALT, Paris (FR)

(72) Inventor: Thierry Chataing, Lans-en-Vercors (FR)

(73) Assignee: Commissariat á l'ènergie atomique et aux ènergies alternatives, Paris (FR)

( * ) Notice: Subject to any disclaimer, the term of this patent is extended or adjusted under 35 U.S.C. 154(b) by 706 days.

(21) Appl. No.: 14/357,059

(22) PCT Filed: Nov. 8, 2012

(86) PCT No.: PCT/EP2012/072136
§ 371 (c)(1),
(2) Date: May 8, 2014

(87) PCT Pub. No.: WO2013/068459
PCT Pub. Date: May 16, 2013

(65) Prior Publication Data
US 2014/0305033 A1      Oct. 16, 2014

(30) Foreign Application Priority Data

Nov. 9, 2011   (FR) ...................................... 11 60206

(51) Int. Cl.
*C10B 47/34*   (2006.01)
*C10L 5/44*    (2006.01)
(Continued)

(52) U.S. Cl.
CPC .............. *C10L 5/447* (2013.01); *C10B 47/34* (2013.01); *C10B 47/44* (2013.01); *C10B 53/02* (2013.01);
(Continued)

(58) Field of Classification Search
CPC ......... C10B 47/34; C10B 47/44; C10B 51/00; C10B 53/02; C10L 5/447; C10L 9/083
See application file for complete search history.

(56) References Cited

U.S. PATENT DOCUMENTS 4,085,897 A      4/1978 Hahn et al.
4,234,391 A *   11/1980 Seader .................. B01D 3/141
                                                   165/104.26
(Continued)

FOREIGN PATENT DOCUMENTS

CN      101709224 A     5/2010
CN      102146308 A     8/2011
(Continued)

OTHER PUBLICATIONS

Combined Office Action and Search Report dated Jul. 22, 2015 in Chinese Patent Application No. 201280066611.5 (with English language translation).
(Continued)

*Primary Examiner* — Jonathan Miller
(74) *Attorney, Agent, or Firm* — Oblon, McClelland, Maier & Neustadt, L.L.P.

(57) ABSTRACT

A reactor for grinding and roasting biomass, including: a chamber interiorly delimited with internal walls; a grinder laid out inside the chamber, including a central rotary shaft rotatably mounted in the chamber and grinding elements present on the central rotary shaft for grinding against internal walls and of biomass, or lingo-cellulosic biomass, present inside the chamber; a heater for heating and main-
(Continued)

taining by thermal conduction via the grinder the biomass present inside the chamber, at a predetermined called roasting temperature between 200° C. and 350° C., to simultaneously achieve grinding and roasting of the biomass in the chamber.

16 Claims, 3 Drawing Sheets

(51) Int. Cl.
  *C10B 53/02* (2006.01)
  *C10B 47/44* (2006.01)
  *C10L 9/08* (2006.01)
(52) U.S. Cl.
  CPC ....... *C10L 9/083* (2013.01); *C10L 2200/0469* (2013.01); *C10L 2290/06* (2013.01); *C10L 2290/08* (2013.01); *C10L 2290/28* (2013.01); *C10L 2290/56* (2013.01); *Y02E 50/10* (2013.01); *Y02E 50/14* (2013.01); *Y02E 50/15* (2013.01); *Y02E 50/30* (2013.01)

(56) References Cited

U.S. PATENT DOCUMENTS

| | | | | |
|---|---|---|---|---|
| 4,308,103 | A * | 12/1981 | Rotter | C10B 7/10 201/25 |
| 4,787,843 | A * | 11/1988 | Huffman | C30B 15/14 165/104.27 |
| 4,908,104 | A * | 3/1990 | Loomans | C10B 47/44 201/25 |
| 5,017,269 | A * | 5/1991 | Loomans | C10B 7/10 201/25 |
| 5,294,061 | A | 3/1994 | Dijk | |
| 6,105,275 | A * | 8/2000 | Aulbaugh | B09B 3/00 110/229 |
| 8,100,990 | B2 * | 1/2012 | Ellens | C10B 49/10 201/13 |
| 8,394,240 | B2 * | 3/2013 | Rinker | C10G 1/00 201/15 |
| 8,444,828 | B2 * | 5/2013 | Wolfe | C10B 47/44 201/15 |
| 8,900,415 | B2 | 12/2014 | Rolland et al. | |
| 9,045,693 | B2 * | 6/2015 | Wolfe | C10J 3/007 |
| 9,321,964 | B2 * | 4/2016 | Lepez | C10B 7/10 |
| 2003/0221363 | A1 | 12/2003 | Reed | |
| 2007/0040055 | A1 | 2/2007 | Riendeau et al. | |
| 2008/0054112 | A1 | 3/2008 | Farris | |
| 2008/0142354 | A1 * | 6/2008 | Yokoyama | C10B 49/04 201/41 |
| 2009/0229491 | A1 | 9/2009 | Harmon | |
| 2010/0064937 | A1 | 3/2010 | Harmon et al. | |
| 2010/0243213 | A1 * | 9/2010 | Obara | C09K 5/04 165/104.26 |
| 2010/0275514 | A1 * | 11/2010 | Paganessi | C10B 53/02 48/86 R |
| 2011/0209977 | A1 | 9/2011 | Rolland et al. | |
| 2011/0214343 | A1 | 9/2011 | Wechsler et al. | |
| 2011/0266381 | A1 | 11/2011 | Harmon | |
| 2012/0266485 | A1 | 10/2012 | Abraham et al. | |
| 2014/0003968 | A1 | 1/2014 | Gros-D'aillon et al. | |
| 2014/0298716 | A1 * | 10/2014 | Marty | B01J 8/125 44/629 |

FOREIGN PATENT DOCUMENTS

| | | |
|---|---|---|
| FR | 2 924 435 A1 | 6/2009 |
| GB | 2 448 531 A | 10/2008 |
| JP | 60-899 A | 1/1985 |
| WO | 90/08177 | 7/1990 |
| WO | 98/09997 | 3/1998 |
| WO | 2009/114195 | 9/2009 |
| WO | 2011/057822 | 5/2011 |
| WO | 2011/112526 | 9/2011 |

OTHER PUBLICATIONS

Wang, "Petrochemical Design Handbook" first edition, Chemical Industry Press, Jan. 31, 2002, 3 Pages.
E. Zuoxing, et al., "Straw Solid Fuel Technology" first edition, Heilongjiang People's Publishing House, Jul. 31, 2009, 5 Pages.
International Preliminary Report on Patentability dated May 15, 2014 in PCT/EP2012/072136 filed Nov. 8, 2012 (with English translation).
International Search Report dated Jan. 28, 2013, in PCT/EP12/072136, filed Nov. 8, 2012.
French Search Report dated Feb. 16, 2012 in Application No. FR 1160206 filed Nov. 9, 2011.
French Preliminary Search Report dated Feb. 16, 2012 in Patent Application No. FR 1160206 (with English Translation of Category of Cited Documents).
Nobusuke Kobayashi, et al., "A new pulverized biomass utilization technology" Powder Technology, vol. 180, Jan. 22, 2008, pp. 272-283.
Mark J. Prins, et al., "Torrefaction of wood Part 1. Weight loss kinetics" Journal of Analytical and Applied Pyrolysis, Mar. 2006, pp. 28-34.

* cited by examiner

REACTOR FOR GRINDING AND ROASTING BIOMASS, BIOMASS PROCESSING SYSTEM AND FACILITY INCORPORATING SUCH A REACTOR, AND ASSOCIATED METHOD

TECHNICAL FIELD

The invention relates to a novel reactor for roasting and milling biomass, preferably ligno-cellulosic biomass, as well as to a system and an installation for treating biomass, integrating such a reactor and its associated application method.

The main application targeted by the invention is the production of fuels called biofuels. Biofuels conventionally consist of ligno-cellulosic biomass and are obtained by shredding, typically wood chips or by granulation for more elaborate biofuels.

The invention therefore in particular relates to an installation for treating biomass applying a granulation press downstream from the novel roasting and grinding reactor in order to obtain biofuels with improved characteristics as compared with those put on the market to this day. With a combined roasting and granulation treatment, it is possible to obtain biofuels with a high energy density, typically of the order of 20 to 22 MJ/kg, a high mass density, typically in the order of 600 to 650 kg/m$^3$, and significant hydrophobic properties. The inventors therefore aim at an improvement in the hydrophobic properties of biofuels as well as an increase in their energy content, typically of more than 20 to 30%, as compared with those of presently existing biofuels.

The invention also applies to gasification of biomass with view to producing biofuels from synthesis gas widely known under the name of Syngas. In this application, the novel roasting and grinding reactor according to the invention is preferably installed upstream from a unit for conditioning/storing powder, itself upstream from a gasification reactor in order to produce biofuels subsequently.

PRIOR ART

In a context where consumption continues to increase, upgrading of biomass is contemplated in order to diversify energy resources. The technologies of thermal conversion by gasification and combustion are particularly contemplated. Combustion of biofuels is a particular option thereof.

Roasting the biomass, preferably ligno-cellulosic biomass, is a step for pretreating the biomass. Indeed, the fibrous and elastic structure of biomass makes its micronization energy-intensive and gives the milled product unsuitable characteristics for injection in a powdery form. Roasting is a mild thermal treatment of biomass at the interface between drying and pyrolysis, generally carried out at temperatures comprised between 200° C. and 350° C. and which aims at removing water and at modifying one portion of the organic material of the biomass in order to break its fibers.

In other words, this mild heat treatment alters the fibrous structure of the biomass, thereby facilitating its grinding and its injection into a gasification or co-combustion reactor.

The pretreatment by roasting also improves the properties of the biomass in particular with view to its storage by notably giving it hydrophobicity and resistance to biological degradations.

Roasting of the ligno-cellulosic biomass is therefore a pretreatment step with view to its injection in a powdery form into in an entrained-flow reactor (gasification reactor) or into a so-called co-combustion reactor (biomass and coal) in a coal thermal power plant or with view to its granulation for producing biofuels.

With industrial installations presently existing on the market, in order to obtain improved characteristics of biofuels, as mentioned in the preamble, the biomass should undergo roasting for a standard period from 20 to 40 minutes. This treatment period is important and this is why it requires large size installations depending on the technology used. Mention may be made of the corporations, CMI, Whysmont or TOPELL which already apply this type of installations.

Further, as indicated in the preamble, a combined treatment of roasting and granulation gives the possibility of obtaining biofuels with a high energy density, typically of the order of 20 to 22 MJ/kg, a high mass density, typically of the order of 600 to 650 kg/m$^3$, and significant hydrophobic properties.

Patent application US 2003/0221363 discloses in a very general way, a biomass treatment which combines a roasting step with a subsequent granulation step clearly distinct from the roasting. Various heating technologies are mentioned for applying roasting (see paragraph [0050]): oven with multiple soles with an integrated burner of FIG. 2; a heating wormscrew with an integrated burner of FIG. 3; a fluidized bed heater; a rotary oven; an intermittent oven). In fact, the whole of these technologies have not been industrially tested to this day. No guarantee seems to be provided on the good mechanical strength of the granules produced at the oulet of the drum compactor referenced as 30 in FIGS. 2 and 3.

Further, if energy integration seems well established, notably of the compactor, immediately downstream from the roasting reactor, no mention is made on the operating conditions. In particular, no detail is given on the time required for roasting, the parameter which however is essential for controlling roasting.

Technico-economic studies of the various methods show that controlling the dwelling time of the biomass particles during the treatment is an essential criterion for evaluating roasting methods and directly conditions their economic interest. Here mention may be made of publication [1] which clearly illustrates this criterion.

Moreover, feedback from the inventor of the present invention on roasting shows that the biomass temperature/dwelling time pair is closely related to the type of biomass used (wood, straw, etc. . . . ). For a given roasting time, the temperature is an adjustable parameter with which it is possible to respond to the variability of the biomass in the majority of cases. To this day, the required dwelling time in the roasting step may be described as significant, i.e. of the order of 20 to 50 minutes, since it is directly related to the relatively significant size of the biomass particles subject to roasting, typically of the order of one centimeter.

Moreover, a large number of publications update the requirement of having a predetermined dwelling time/treatment temperature pair for controlling roasting in general and in particular the loss of mass which results from this.

Patent GB 2448531 presents a roasting technology dedicated to coarsely cut biomass of the order of 100 mm of length per particle, before being ground and brought back to a final size of the order of 10 mm per roasted particle and then ground upstream. Roasting is carried out at a temperature of 300° C. for a period of 15 mins leading to a significant mass loss, i.e. of at least 40% (see page 8 lines 20 to 24). The solution developed according to this patent GB 2448531 is only adapted to a co-combustion application with coal and does not show any optimization of the roasting treatment time. On the contrary, the choice of using as input to the method, coarsely cut biomass, of a large size, further increases the time required for roasting.

Moreover, it is known in domains other than that of biomass, how to carry out a hot grinding step, i.e. at temperatures comprised between 100-350° C. of the material to be treated.

Thus, the carrying out of a hot grinding step by means of a hammer grinder has already been contemplated, in particular for treating heavy petroleum residues of the asphalt type, as described in patent application WO 2009/114195 A1, or for plastic material degradation, as described in patent application WO 98/09997. In this application WO 98/09997, the indicated temperature range is comprised between 200-500° C., but requires preheating of the load before grinding. Patent application WO 9008177 finally relates to the recovery of oil in extraction sludges and describes the operation of a hot hammer grinder, at a temperature of the order of 225° C. with temperature regulation by an oil bath for avoiding degradation of the oil during the operation. Further separating the generated dust from the gas is provided by means of a cyclone (see FIG. 3). In the three mentioned patent applications, not only it is in no way intended to carry out hot grinding of biomass, but no teaching may be drawn for actually doing this. Thus, controlling the dwelling time in the relevant grinder is not mentioned since it is in fact non-essential for their relevant application.

Also the possibility of combining a step for milling a material and a drying step into a single operation is also known from the prior art.

Thus, patent U.S. Pat. No. 4,085,897 proposes a dryer-milling machine for a priori treating any type of materials and in particular coal. If the disclosed solution is well adapted to drying with air, it is incompatible for roasting biomass which should be performed with a minimum of oxygen in order to avoid combustion of the biomass during its roasting and runaway of the reaction.

Patent JP 60000899 proposes the same approach but with air at higher temperatures, comprised between 200 and 400° C. for treating sludges. The disclosed solution is therefore incompatible with a biomass roasting step. Further, the indicated temperatures are incompatible with a drying step since doing this, would amount to generating VOC (Volatile Organic Compounds) emissions which have to be controlled in order to observe environmental standards.

Finally, from patent application FR 2924435A1, the possibility is known of combining a grinding step and a ligno-cellulosic biomass roasting step into a single operation necessarily applied in a fluidized bed reactor. The established goal of this solution according to application FR 2924435 is the reduction of the grinding energy consumption, and the dwelling time of the biomass particles is not a real issue. Thus, the given dwelling times remain those conventionally used to this day for a roasting step, i.e. significant times from 10 to 40 minutes, since they remain dependent on the grain size at the entry of the fluidized bed of the particles (see page 4 lines 20-23). Now, as indicated in the preamble, controlling the dwelling time of the particles during the treatment is an essential criterion for evaluating roasting methods and directly conditions their economic interest. Further, upon reading this patent application, one does not really know how the temperature required for roasting particles is set, even if a priori it is set by the carrier gas for setting the particles into motion at the inlet through the central tubing. Moreover, one does not know how the energy required for heating a carrier gas is provided.

Further, because of the actual design of the fluidized bed reactor, there are many heat exchanges between the particles and the carrier gas on the one hand and the particles and the applied members of the knife milling machine (see FIG. 4). In other words, there is no control of the heat exchanges. Moreover, the knife milling machine applied has certain drawbacks directly related to the roasting step.

Actually, this thermochemical transformation modifies the intrinsic characteristics of the treated biomass with in particular polymerization making the obtained powder very abrasive. It may be inferred therefrom that very fast degradation (erosion) of the knives may occur with, as a corollary, dispersion of the grain size of the particles at the outlet and therefore gradual malfunction of the installation. Finally the inventor believes that the milling-roasting operation according to this application FR 2924435 is difficult to apply in particular with very complex controlling conditions, considering the given accuracy on the fluidization rates to be observed versus the great variability of the treated biomass (composition, humidity level) on the one hand and the very wide covered pressure range (1 to 30 bars) on the other hand. Indeed, during the roasting operation, gases are emitted in a greater or lesser amount depending on the temperature and on the dwelling time of the particles. This gas evolvement directly impacts the fluidization rate and therefore the operation of the fluidized bed.

An object of the invention is therefore to propose a solution applying a roasting step and a biomass grinding step during a single operation, i.e., in a single chamber of a reactor and which overcomes all or part of the drawbacks of patent application FR 2924435.

A particular object is therefore to propose a solution for adapting an existing grinder technology in order to concomitantly apply grinding and roasting, while controlling the heat exchanges in considerably reduced dwelling times of the particles in the chamber of the grinder, preferably less than 5 minutes. Indeed, tests conducted on biomass particles of very small sizes, of the order of 200 µm, show that the optimum roasting conditions (mass loss, energy content) may be obtained for dwelling times of less than 5 minutes depending on temperature.

Another object of the invention is to propose an installation for treating biomass integrating a reactor concomitantly applying grinding and roasting and comprising a granulation press downstream from the reactor, for which the energy balance is performing.

DISCUSSION OF THE INVENTION

To do this, the invention relates to a biomass grinding and roasting reactor, comprising:
a chamber interiorly delimited by internal walls;
grinding means, laid out inside the chamber, and adapted for grinding biomass, preferably ligno-cellulosic biomass;
heating means adapted for heating and maintaining temperature by thermal conduction of at least one portion of the grinding means and at least one portion of the internal walls of the chamber at a predetermined temperature, a so-called roasting temperature, comprised between 200° C. and 350° C. in order to simultaneously achieve grinding and roasting of the biomass inside the chamber.

The invention also deals with a biomass grinding and roasting reactor, comprising:
a chamber interiorly delimited by internal walls;

grinding means laid out inside the chamber, including a rotary central shaft rotatably mounted in the chamber and grinding elements present on said rotary central shaft for grinding against the internal walls biomass, preferably ligno-cellulosic biomass, present inside the chamber;

heating means for heating and maintaining by thermal conduction via the grinding means the biomass present inside the chamber, to a predetermined temperature, a so-called roasting temperature, comprised between 200° C. and 350° C., in order to simultaneously achieve grinding and roasting of the biomass in the chamber.

The invention applies a combined action of grinding and of a roasting heat treatment which allows a reduction in the size of the particles and therefore the treatment time of the particles, a so-called dwelling time in an environment varying from 200 to 350° C.

The invention essentially consists of achieving rapid roasting by the synergistics between the means of the grinder, its operating conditions and the operating conditions of the roasting.

By means of the invention, controlling a short dwelling time and the temperature for the roasting operation may be contemplated.

The invention provides a considerable gain in compactness and in energy optimization next to a sequential configuration of roasting and grinding operations before granulation.

The inventor started from the observation that the roasting heat treatment is closely related to the actual temperature of the particles, and therefore from the observation that the heat treatment has to be optimally controlled, i.e. control of the injection method of the energy and maximization of the exchange coefficients between the particles of biomass to be roasted and the hot contacting portions.

The inventor then made an inventory of the different heat transfer modes as known: these modes which are convection, radiation and conduction, closely depend on the exchange configuration, i.e. on the nature of the contacting elements, as this emerges from FIG. 1. From this FIG. 1, it is seen that the heat exchanges between gas and solid are the weakest; the solid/solid exchanges are much greater but closely limited by the contact resistance between the solids, finally the exchanges between solid and liquid are still better and attain a maximum during a phase transition of the liquid (boiling), as this is described in publication [2].

In order to attain control of the heat treatment, the solution proposed in patent FR 2924435 mentioned in the preamble, consists in a knife milling machine associated with a fluidized bed. From a non-exhaustive comparison of the different types of milling machine as schematized in the diagram of FIG. 2, it appears that a solution of a milling machine with knives and with a fluidized bed like the one of application FR 2924435 is the one which requires the highest flow rate of sweep gas. Further, as shown in FIG. 1, this solution applies low heat exchange coefficients (gas/solid exchanges essentially).

The idea at the basis of the invention is therefore to maximize energy transfer to the biomass particles while controlling at best the roasting temperature. Against the solutions proposed for roasting biomass according to the state of the art, the inventor had the idea of doing without gas for providing the heat energy directly to the particles via constitutive elements of the milling machine and more particularly via milling means. In other words, the inventor had the idea of adapting an existing milling machine technology by promoting at most solid/solid heat exchanges, i.e. by reducing to a maximum the contact resistances between the milling means (hammers, knives or milling bodies) inside the chamber and biomass particles.

In other words, the invention consists of providing the roasting energy to the particles making up the biomass via the milling means which are heated by direct contact with heating means.

Preferably, the milling means and the internal walls of the chamber have substantially identical heat conductivities.

Advantageously, when the material of the internal walls is selected from steel or stainless steel 304L, then that of the grinding means may be selected from hard steels, such as 350HB steel. The internal walls of the chamber of the reactor may be coated with a shielding material such as CREUSABRO©, which is suitable within the scope of the invention. The heating means advantageously consists in heat piping elements in physical contact with the peripheral walls of the chamber.

According to the type of relevant grinding means, at least one heat piping element in physical contact with at least one portion of the grinding means may further be contemplated.

In addition to the considerable gain on heat exchanges, by putting the heat piping elements in contact with the peripheral wall of the chamber and/or with the grinding means present on the rotary central shaft, it is possible to guarantee that the roasting temperature is accurately maintained during the grinding of the biomass particles and optionally in every point of the reactor. Thus the energy supply is maximized while finely controlling the temperature of the roasting/grinding method.

It is advantageous to distribute the heat pipe around the peripheral wall of the chamber, their number of course depending on the dimensions of the chamber.

Typically, in a first approach, the heat pipes are distributed every 40 to 50 cm if the peripheral wall of the chamber is in mild steel. Thus, preferably a plurality of heat piping elements is provided, uniformly distributed at the periphery and in physical contact against the peripheral wall of the chamber over at least one major portion of its length.

In order to guarantee that the temperature of the rotating grinding means (knives, hammers) is maintained, a heat piping element laid out inside a central shaft on which at least one portion of the grinding means is attached or present, is advantageously provided, the shaft being rotatably mounted in the chamber over at least one major portion of its length. Considering the sizes usually encountered for grinding means, such as hammers, and the nature of their material(s), typically steel, the conduction in these material(s) gives the possibility of guaranteeing a small temperature gap between the rotating grinding means (hammers, knives) and the rotary shaft on which they are attached: typically, it is possible to obtain a gap of less than 2° C. for a conductivity of 45 W/m$^{2\circ}$ C. over a length of 40 cm with a flow of 225 W/m$^2$.

For purposes of energy integration in an installation for treating biomass and in order to increase heat exchanges, the heat piping elements according to the invention are each provided, at least at one of their ends with fins for forming a heat exchanger between a gap and the heat transfer fluid inside said heat pipe.

As regards the selection of the heat transfer fluid of the heat pipes according to the invention, the inventor made an inventory of those presently known. The summary Table 2 extracted from publication [3] gives an exhaustive view. Within the scope of the invention, the inventor believes that Gilotherm® DO and Naphthalene are the best suited for meeting the operating conditions of the reactor according to the invention. Of course, one skilled in the art may select other heat transfer fluids in heat pipes with other chamber materials depending on the contemplated applications (type of biomass to be treated).

An alternative solution to the aforementioned heat pipes may consist of heating a heat transfer fluid circulating in the different portions of the grinder requiring that their temperature be controlled, for example in grinding elements present on the rotary central shaft rotatably mounted in the chamber and/or the actual shaft. The reactor may then include a hydraulic pump giving the possibility of adapting the flow rate of the heat transfer fluid in the previous element according to the desired temperature.

As regards the technology of grinders to be adapted within the scope of the invention, the inventor believes that two types of grinder have particularly suitable characteristics for the roasting operation: the hammer grinder and the vibrating grinder.

The hammer grinder provides a very large heat exchange capacity by direct action of the hammer and the shell of the reactor on the biomass particles. It is thus preferable to perform preheating of the shell and of the hammers of the grinder and also inject a preheated gas. Another advantage of the hammer grinder relates to its resistance to abrasion and to its already proven capability of treating biomass (conventionally used for producing wood meal upstream from the granulation unit).

Thus, according to a first embodiment, the grinding means comprise hammers attached onto a central shaft rotatably mounted in the chamber, the hammers being adapted for striking and bursting the biomass particles against the peripheral internal wall of the chamber thus forming a grinder of the hammer type. According to this first embodiment, a heat piping element is intended to be mounted inside the central shaft, the mounting allowing the heat piping element to be also in rotation with the shaft. The efficiency of the heat piping element is thus further increased by the effect of centrifugation of the liquid contained in the heat pipe which will therefore be distributed over the walls of the tube of the latter.

In order to control and adjust the dwelling time of the biomass particles in the hammer grinder, two alternatives may be provided depending on the position in an installed configuration of the reactor. By a position in an installed configuration, is meant the position that the reactor according to the invention occupies when it operates, i.e. when it applies a simultaneous operation for grinding and roasting biomass.

When the reactor/hammer grinder according to the invention is installed with its longitudinal axis at the vertical, the use of a first dynamic variable speed selector is preferred.

The main advantage provided by a dynamic selector is its flexibility in selecting and adjusting the size of the particles at the reactor outlet by varying its speed of rotation (possible adjustment according to the type of treated biomass).

When the reactor/hammer grinder according to the invention is installed with its longitudinal axis horizontal, suction of the particles downstream from the reactor is preferably achieved, as explained hereafter: the grain size distribution in the reactor is thereby considerably reduced and its yield is improved.

Other grinder technologies have advantageous characteristics for performing the combined grinding and roasting operation according to the invention. As mentioned above, the vibrating grinder intrinsically has excellent properties: grinding with low energy consumption, narrow grain size distributions, not many airborne particles reducing the risks of explosive atmospheres (ATEX regulations following European directives) and finally, control of the dwelling time by a throttle valve at the outlet of the grinder.

According to a second embodiment, the grinding means are formed by grinding bodies freely mounted inside the chamber, and the reactor comprises means for setting the chamber into vibration, the vibration means of the chamber against the grinding bodies being adapted so as to crush the biomass particles between the grinding bodies on the one hand and between the latter and the peripheral internal wall of the chamber on the other hand thereby forming a grinder of the vibrating type. The vibration means are preferably associated with counter-weights for adapting the vibration frequency. Within the scope of the invention, it is possible to adapt certain already existing grinders of the vibrating type in order to simultaneously apply the roasting step. For example, vibrating grinders marketed under the trade name PALLA on behalf of the RITEC Corporation are perfectly adapted. With this type of grinders, bars or cylpebs may also be contemplated inside the chamber as grinding bodies.

According to this second embodiment, the heating means advantageously consist in heat piping elements only distributed to the peripheral wall of the chamber, the heat exchanges between the peripheral wall of the chamber and the grinding bodies on the one hand and between the grinding bodies with each other on the other hand allowing better transmission of heat to the biomass particles.

Because of its large sensitivity to the humidity level of the incoming product and to the increased mass losses during the extensive roasting operation, the second embodiment is preferred for dried biomasses with a small humidity level.

The use of a first dynamic variable speed selector according to this second embodiment is also advantageous. Preferably, the layout of this first dynamic selector is such that it is placed in the upper portion of the reactor, still preferably in the last third of the grinding tube which allows the produced gases (roasting gases+steam) to be discharged. Thus operation of the reactor as usual for a vibrating grinder is guaranteed.

The invention therefore also relates to a system comprising a biomass grinding and roosting reactor as described earlier and a first dynamic variable speed selector immediately downstream from the reactor, said first dynamic selector being adapted so as to obtain at the outlet of the reactor particles of less than a first desired diameter and for reinjecting into the grinder, particles with a diameter greater than the first desired diameter.

Finally adapting a knife grinder technology may be envisioned. According to a third embodiment, the grinding means thus comprise notches made on a central shaft rotatably mounted in the chamber, the notches being adapted for cutting the biomass particles against the peripheral internal wall of the chamber, thereby forming a grinder of the knife type.

Just like the first embodiment, a heat piping element is intended to be mounted inside the central shaft, the mounting allowing the heat piping element to be also in rotation with the shaft. The efficiency of the heat pipe is thus improved all the more by the effect of centrifugation of the liquid contained in the heat pipe which will then be distributed over the walls of the tube of the latter.

The invention also relates to a method for applying a reactor or a system as described earlier, according to which the heating means are preheated until they attain the predetermined roasting temperature, comprised between 200° C. and 350° C., before feeding the reactor with dried biomass.

Preferably, the dried biomass supply is accomplished with a humidity level of the latter in a range from 10 to 15%. This level is advantageous since it more or less degrades the overall energy yield of the roasting method according to the invention.

Preferably feeding the reactor with dried biomass is achieved by gravity.

In the case of a significant supply of energy to be achieved, a flow of gases brought to a predetermined roasting temperature are further directly injected into the chamber.

As indicated above, when the reactor is in a horizontal position in a configuration of use, suction of the particles downstream from said reactor is preferably achieved.

The invention finally relates to an installation for treating biomass, preferably ligno-cellulosic biomass, for producing biofuels as granules.

Thus, the installation comprises a reactor or a system as described earlier and a granulation press and further a second dynamic selector connected downstream to the reactor, and if necessary to the first dynamic selector, the second dynamic selector being adapted for separating particles at the outlet of the reactor and having a smaller diameter than the first diameter, those for which the diameter is greater than a second desired diameter, one of the outlets of the second dynamic selector being connected to the granulation press for feeding it with particles with a size comprised between the first and the second diameter, the other one of the outlets of the second dynamic selector being adapted for extracting particles with a size smaller than the second desired diameter. The second desired diameter corresponds to very fine biomass particles, notably with an apparent diameter of less than 10 μm. The second dynamic selector is preferably associated with a cyclone: the cyclone is thus laid out between the second dynamic selector and the granulation press. As regards the granulation press, a press is selected which operates at roasting temperatures, i.e. between 200 and 300° C., which allows granules to be obtained with reduced energy consumption and with excellent mechanical strength of the granules. For example, granulation presses marketed by Promill-Stolz Corporation are perfectly suitable.

For purposes of energy integration, the outlet of the second dynamic selector adapted for extracting particles of a size of less than the second desired diameter, is connected to a combustion chamber distinct from the reactor chamber, adapted for performing a post-combustion of the gases from the roasting and of the particles with a size of less than the second diameter at a predetermined post-combustion temperature, comprised between 800 and 1,000° C., preferably equal to 850° C. In other words, the gas from the reactor loaded with fine roasted biomass particles is used as a fuel in a post-combustion chamber preferably operating at 850° C.

Care is then taken to adjust the speed of the second dynamic selector for obtaining self-sufficiency in energy for the post-combustion chamber under steady conditions. In other words again, adjusting the LCV (acronym for lower calorific value) of the gas plus the particles is subordinated to the speed of the second dynamic selector.

Advantageously, the combustion chamber comprises at least one multi-fuel burner for simultaneously achieving post-combustion of the gases from the roasting and of particles with a size smaller than the second diameter and of solid fuels. The multi-fuel burner is advantageously connected to the granulation press so that the solid fuel pellets are roasted granules produced by said granulation press.

Such a burner allows fast and precise adjustment of the post-combustion temperature in the transitional phases (warm-up, oscillations) by burning granules and preferably produced by the granulation press. As multi-fuel burners which may be used in the invention, mention may be made of those marketed by Leroux & Lotz Technologie.

Thus, advantageously, the output of the combustion chamber is connected to the reactor so as to heat the heating means with the post-combustion gases.

According to one characteristic, the output of the combustion chamber is connected to the inlet of the reactor so as to inject the post-combustion gases, at the roasting temperature into the reactor chamber.

According to another characteristic, the output of the combustion chamber is connected to the heat exchangers formed by the fins of the heat pipes such that the energy for heating the heat transfer fluid of the heat pipes is supplied by the post-combustion gases.

According to an advantageous embodiment, the system further comprises an additional heat exchanger, distinct from the heat exchangers of the heat pipes, the hot fluid circuit of which is connected to the outlet of the combustion chamber and the cold fluid circuit of which is connected adapted to a dryer for drying the biomass prior to supplying it to the reactor, so that the energy for heating the dryer is provided by the post-combustion gases.

In other words, the combustion gases exiting the post-combustion chamber reach the additional heat exchanger in order to preheat either steam or gas and send it into the biomass dryer on the one hand and to adjust the temperature of the post-combustion gases to a variable value depending on the treated biomass, typically between 250 and 350° C., and to inject them into the reactor chamber on the other hand. By using the additional heat exchanger in the biomass treatment system according to the invention, the roasting temperature in the heat exchanger is even better controlled, tending to stabilize the roasting/grinding method.

SHORT DESCRIPTION OF THE DRAWINGS

Other advantages and features of the invention will become better apparent upon reading the detailed description of the invention given as an illustration and not as a limitation with reference to the following figures wherein.

Figure 3:
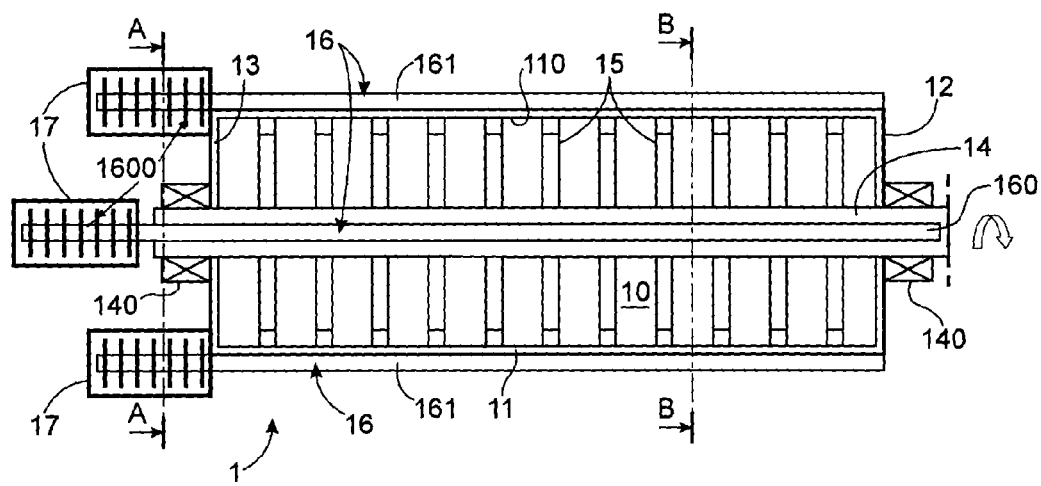
FIG. 3 is a schematic longitudinal sectional view of a biomass grinding and roasting reactor according to the invention of applying hammer grinder technology.
Figures 3A, 3B:
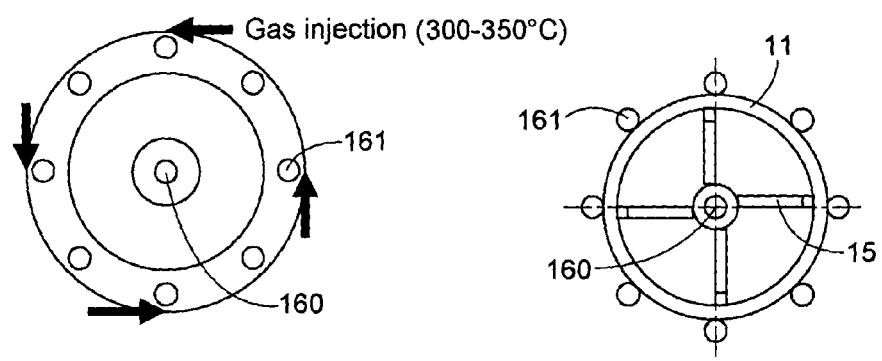
Figure 4:
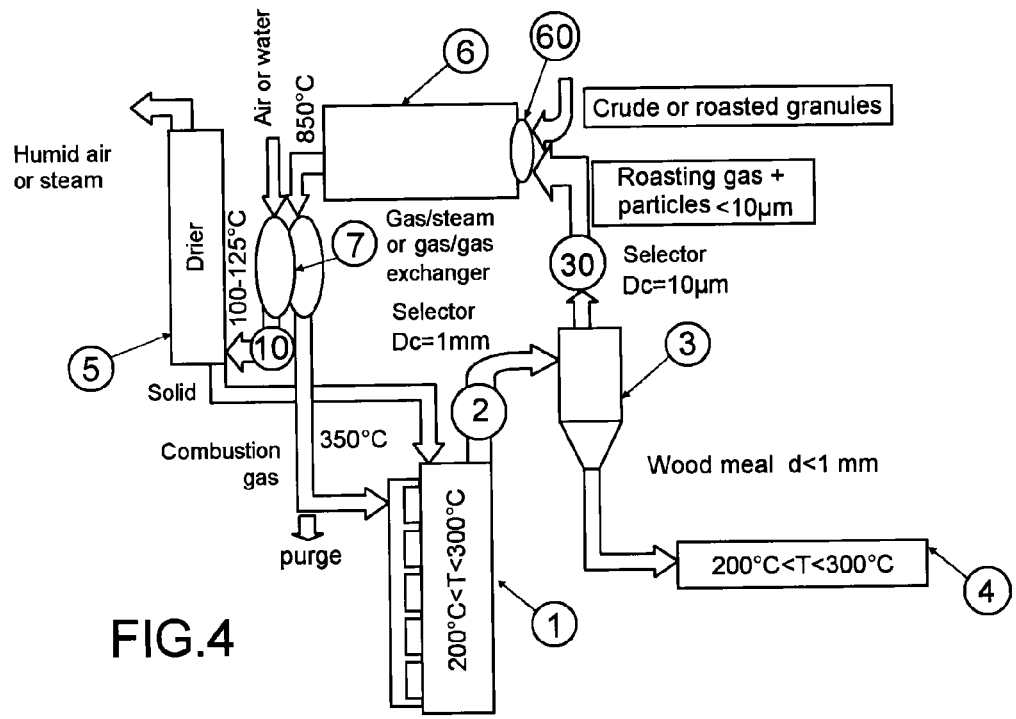
Figure 5:
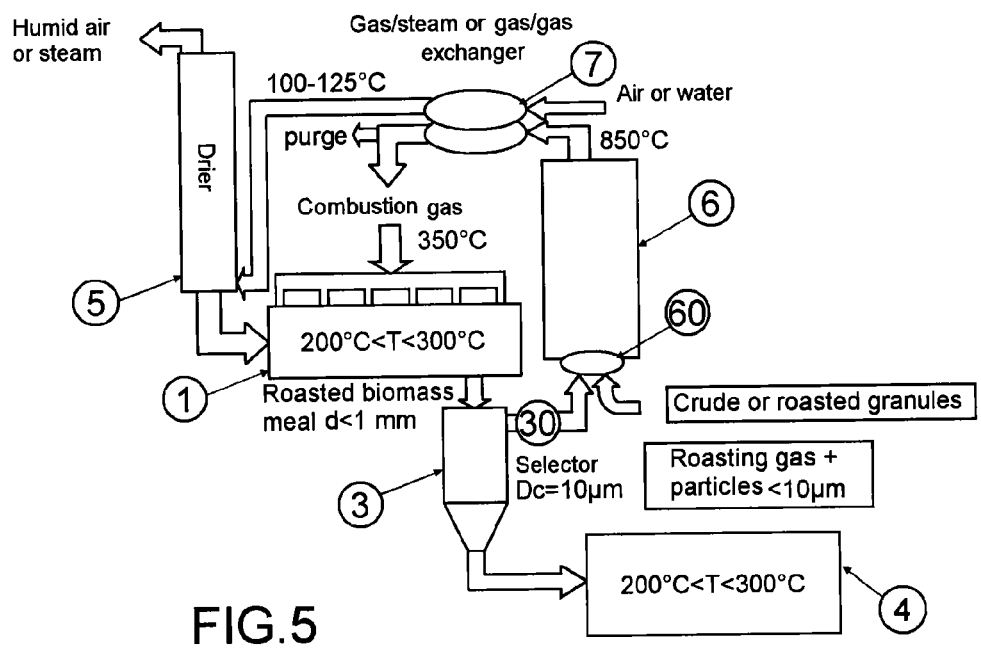

FIGS. 3A and 3B schematic transverse sectional views of the reactor of FIG. 3;

FIG. 4 is a schematic view of a first embodiment of a biomass treatment installation integrating a biomass grinding and roasting reactor according to the invention;

FIG. 5 is a schematic view of a second embodiment of a biomass treatment installation integrating a biomass grinding and roasting reactor according to the invention.

DETAILED DISCUSSION OF PARTICULAR EMBODIMENTS

In the following description, the terms of «inlet», «outlet» «upstream», «downstream» are used with reference to the transfer direction of the biomass and of the fluids both in the reactor according to the invention, in a system and an installation integrating such a reactor. Further, the terms of «upper», «lower», «above», «below» are used with reference to the vertical or horizontal physical orientation of the reactor and of the dryer of the installation according to the invention.

By diameter of the particles, is meant to their equivalent diameter, i.e. the diameter of the sphere which would behave identically during a selected grain size analysis operation.

Figure 1:
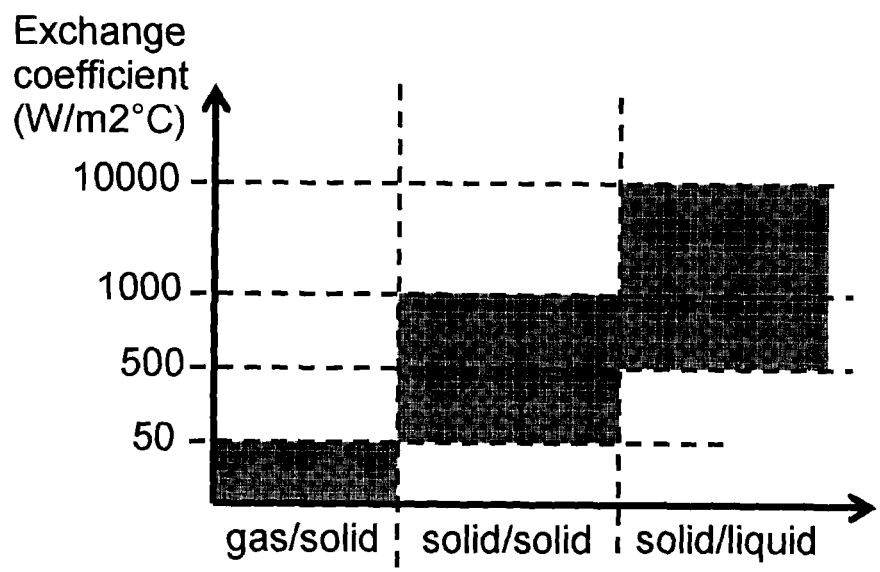
FIG. 1 is a diagram showing the heat exchange coefficient levels depending on the fluids or solids in mutual contact.
Figure 2:
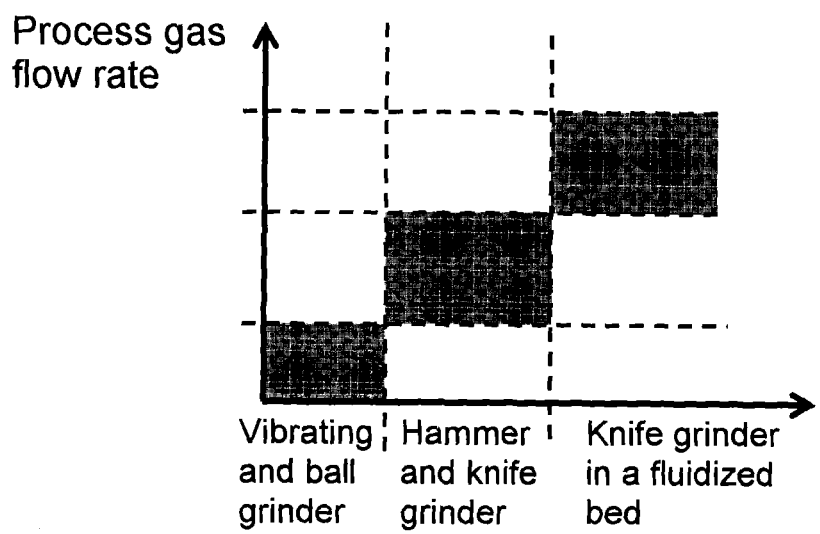
FIG. 2 is a diagram showing the purge gas flow rates according to the technology of grinders used according to the state of the art.

FIGS. 1 and 2 have been commented on above. So they will no longer be commented on here.

In FIGS. 3 to 3B, is illustrated a reactor for concomitant grinding and roasting ligno-cellulosic biomass, like wood, according to the invention.

The reactor 1 according to invention comprises a single chamber 10 delimited at its cylindrical periphery with a side wall 11, and respectively on either side with two end walls 12, 13.

The illustrated reactor 1 is made from a hammer grinder. Thus the reactor comprises a central rotary shaft 14 mounted on bearings 140 arranged on the outside of the chamber 1.

A plurality of hammers 15 is attached onto the rotary shaft 14 defining stages regularly spaced along the chamber. Each stage also comprises a number of regularly distributed angularly hammers 15.

As visible in FIGS. 3 and 3B, a number of eleven stages is thus provided along the chamber, each stage comprising a number of four hammers positioned from 15° to 90° relatively to each other.

Thus, when the biomass, dried beforehand to a humidity level preferably comprised between 10 and 15%, is supplied into the reactor 1, the rotating hammers 15 via the shaft 14 will strike and burst the biomass particles against the peripheral internal wall 110 of the chamber.

According to the invention, in order to simultaneously achieve grinding and roasting of biomass within the chamber 10, while controlling at best the heat exchanges between the different elements of the reactor (side wall, hammers, rotary shaft) and the biomass particles being roasted, implantation of suitable heat pipes 16 is provided for heating the hammers 15 and the rotary shaft 14 on which they are mounted, maintaining their temperature via thermal conduction, heating the side wall 11 of the chamber to a predetermined so-called roasting temperature comprised between 200° C. and 350° C.

More specifically, a first heat pipe 160 is inserted into the inside of the rotary shaft 14. The provided assembly is such that the relevant heat pipe rotates with the shaft 14. The efficiency of the heat pipe 160 is even further improved by the centrifugation effect of the liquid which it contains, the latter will be distributed over the whole of the internal wall of the heat pipe during rotation.

As better illustrated in FIGS. 3A and 3B, second heat pipes 161 are in physical contact with the side wall 11 of the reactor. These second heat pipes 161 are regularly distributed angularly.

As visible in FIGS. 3A and 3B, a number of eight heat pipes 161 is thus provided on the perimeter of the chamber and on the whole height thereof, the eight heat pipes 161 being distant from each other at 45°.

As visible in FIG. 3, the ends 1600 of the heat pipes comprise fins so as to form an optimum heat exchanger between a hot gas flowing in each cavity 17 and the heat transfer fluid inside each heat pipe. This heat transfer fluid is preferably naphthalene or Gilotherm® DO.

Further, according to the invention, the dimensioning of the reactor 1 essentially takes into account the adjustment of the required dwelling time for the relevant biomass particles. This adjustment depends on two parameters: the actual temperature of the internal wall 110 of the side wall 11, of the rotary shaft 14, of the hammers 15 in physical contact with the biomass particles, and on the size of the particles. The adjustment may be different depending on the type of biomass used and requires depending on the install configuration of the reactor 1 suitable means downstream from the reactor.

Thus, when the reactor 1 which has just been described is in the vertical position in the install configuration, the implantation of a first dynamic selector 2 adapted for forcing large diameter particles to dwell in the reactor for a longer time in order to combine the size reduction by grinding and the roasting heat treatment.

This configuration is shown in FIG. 3. The ground and roasted particles at the outlet of the reactor are thus calibrated by the first dynamic variable speed selector 2. Typically the speed of rotation is comprised between 2,000 et 4,000 rpm for calibrating the particles with a diameter of the order of 500 μm at the outlet. In FIG. 4, outlet particles calibrated to a diameter of 1 mm are mentioned. The use of the first dynamic selector 2 requires a carrier gas allowing transport of the powder (agglomerated biomass particles) and maintaining the temperature of the latter.

When the reactor 1 which has just been described is in a horizontal position in an installed configuration, a suction is performed downstream from the reactor 1 by means of a fan not shown and through a cyclone 3, which considerably reduces the grain size distribution inside the chamber 10 and improves the yield of the reactor. In other words, it is possible to do without the first dynamic selector 2. This configuration is illustrated in FIG. 5. Biomass particles (roasted biomass meal) calibrated to a diameter of 1 mm were moreover mentioned in this figure.

Preliminary tests according to TGA (acronym of Thermo Gravimetric Analysis) analysis were conducted on small particles for validating the application of the reactor 1 according to the invention, and for defining the conditions of its dimensioning. The obtained results on hard wood (beech) show that the minimum dwelling time for sizes of particles of 200 μm at a temperature of 280° C. should be one minute.

In FIGS. 4 and 5, a complete installation is illustrated, for treating biomass, integrating the reactor 1 according to the invention and allowing granules to be produced by means of a granulation press.

Both illustrated installations are provided for having less energy consumption.

Except for the first the dynamic selector 2 which has just been described and the installed configuration of the reactor 1 (vertical position in FIG. 4; horizontal position in FIG. 5), both installations comprise the same elements with the same relative functions and layout. Also a single detailed description is made for the two distinct configurations.

As mentioned, the installation in FIG. 4 is rather intended for producing granules with the press 4 from roasted wood meal for which the particles have a diameter of less than 1 mm while the installation in FIG. 5 is rather intended for producing granules with the press 4 from roasted biomass meal for which the particles have a diameter of less than 1 mm.

Some biomass is dried beforehand in a dryer 5 at a temperature preferably comprised between 100 and 125° C. This dried biomass is fed by gravity into the grinding and roasting reactor according to the invention 1, the latter being preheated.

In the vertical position in the installed configuration of the reactor 1 (FIG. 4), downstream from the latter, is provided a cyclone 3 in series with a second dynamic separator 30. The cyclone feeds under the effect of gravity the granulation press 4 with the ground, roasted and calibrated particles at the outlet of the reactor 1 on the one hand and under the effect of the ascending vortex a post-combustion chamber 6 with finer particles (diameter of less than 10 μm) at the outlet of the cyclone 3 on the other hand. This second dynamic selector 30 gives the possibility of adjusting the amount of entrained roasted biomass dusts and preferably is installed in the upper portion of the cyclone/separator 3. Typically, the speed of rotation of this second separator 30 is of the order of 10,000 rpm for particles of 10 μm. This second dynamic selector 30 gives the possibility of adjusting the LCV (low calorific value) of the roasting gas by enrichment in roasted solid before feeding the post-combustion chamber 6, more exactly its burner 60 and therefore controlling the temperature thereof. This post-combustion chamber 6 has the main function of destroying tars generated by the roasting (acetic acid, formic acid . . . ).

The combustion chamber 6 comprises a multifuel burner 60 which gives the possibility of producing a mixed combustion of both roasted gases in which are suspended the finest particles 30 separated by the cyclone 3 and of solid granules. The combustion temperature is of the order of 850° C. As mentioned in FIGS. 4 and 5, the solid granules feeding the mixed burner 60 may be roasted or crude and advantageously they are produced by the granulation press 4.

Finally a heat exchanger 7 is laid out downstream from the post-combustion chamber 6. More specifically, the hot fluid circuit is connected to the outlet of the combustion chamber 6 and the cold fluid circuit is connected to the aforementioned dryer 5.

As mentioned in FIGS. 4 and 5, the heat exchanger may be of the gas/gas or gas/steam type. Still more specifically, the hot fluid circuit is connected to the inside of the chamber 10 of the reactor according to the invention on the one hand and to the cavities 17 in which are housed the heat exchanger fins 1600 of the heat pipes 16 (FIG. 3).

Thus, in installations for complete treatment of biomass which have just been described, the energy required for the roasting operation is supplied by two distinct heat transfer means: by thermal conduction through the external shell (side wall 11) of the reactor 1 pre-heated with the gas produced by post-combustion in the combustion chamber 6 and if necessary by the central shaft and the grinding means, homogenized by the heat pipes (components with a phase change) on the one hand, and by direct injection of the hot gas produced by post-combustion in the chamber 6, inside the chamber 10 of the reactor 1 on the other hand. Adjustment of the temperature of the gases is ensured by the heat exchanger 7, which, with the heating of the heat pipes, allows very accurate adjustment of the roasting temperature.

As mentioned above, and according to the technology of the grinder used in the reactor 1 according to the invention, additional provisions of energy may be contemplated. For example, for installations of great capacity (flow rate of more than 3 t/hr), pre-heating the hammers may be contemplated.

Although not shown, decoupling the provisions of energy may be contemplated. Thus, providing the heat energy of the heat transfer fluid for the heat pipes may be envisioned by independent combustion of roasted granules and by using the totality of the energy of the gases produced by the post-combustion in the combustion chamber 6 for producing the drying in the dryer 5.

According to this alternative, it is also possible to obtain better control of the roasting temperature in the reactor 1, the totality of the post-combustion energy being dedicated to the drying.

Although the only illustrated application of the reactor 1 according to the invention is the production of biofuel granules, other applications for producing biofuel may also be contemplated. In the latter applications, it is then possible to install the grinding and roasting reactor according to the invention directly upstream from a unit for conditioning/storing the actual roasted powder upstream from a gasification reactor.

CITED REFERENCES

[1]: Torrefaction of wood, part1 Weight loss kinetics (Mark J. Prins & al) March 2006, JAA77 (Journal of Analytical and Applied Pyrolysis), pp 28-34.
[2]: *Heat transfer Handbook* of Adrian Bejan and Alland D. Kraus;
[3]: *Caloduc*—Techniques de l'ingénieur [B9 545].

The invention claimed is:

1. A biomass grinding and roasting reactor, comprising:
a chamber interiorly delimited with internal walls;
grinding means laid out inside the chamber, including a rotary central shaft rotatably mounted in the chamber and grinding elements present on the rotary central shaft for grinding biomass, or ligno-cellulosic biomass, against the internal walls, present inside the chamber;
heating means for heating and maintaining by thermal conduction via the grinding means the biomass present inside the chamber, at a predetermined roasting temperature, between 200° C. and 350° C., to simultaneously achieve grinding and roasting of the biomass in the chamber, wherein the heating means is configured to perform at least the maintaining during the grinding and roasting of the biomass,
wherein the heating means includes heat piping elements, and
wherein one of the heat piping elements is laid out inside the central rotary shaft and contains a liquid such that the liquid is centrifuged when the central rotary shaft is rotated.

2. The biomass grinding and roasting reactor according to claim 1, wherein the grinding means and the internal walls of the chamber have substantially identical heat conductivities.

3. The biomass grinding and roasting reactor according to claim 1, wherein the heat piping elements are in physical contact with at least one portion of the grinding means.

4. The biomass grinding and roasting reactor according to claim 3, comprising a further plurality of heat piping elements uniformly distributed at a periphery and in physical contact against a peripheral wall of the chamber on at least one major portion of its length.

5. The biomass grinding and roasting reactor according to claim 3, wherein the heat piping elements are in physical contact with the grinding elements present on the central rotary shaft.

6. The biomass grinding and roasting reactor according to claim 3, wherein the heat piping elements each include at least at one of their ends fins for forming a heat exchanger between a gas and a heat transfer fluid inside the heat piping elements.

7. The biomass grinding and roasting reactor according to claim 1, wherein the grinding means comprises hammers present on the central rotary shaft rotatably mounted in the chamber, the hammers configured to strike and burst biomass particles against a peripheral internal wall of the chamber.

8. An installation for treating biomass, or ligno-cellulosic biomass, comprising:
   the reactor according to claim 1; and
   a granulation press located downstream of the reactor.

9. The biomass treatment installation according to claim 8, further comprising a cyclone laid out between the reactor and the granulation press.

10. The biomass treatment installation according to claim 8, further comprising a combustion chamber distinct from the reactor chamber, the combustion chamber being configured to achieve post-combustion of the gases from the roasting and particles of a size less than a predetermined diameter at a predetermined, post-combustion, temperature between 800° and 1,000° C.

11. The biomass treatment installation according to claim 10, wherein the combustion chamber comprises at least one multifuel burner for simultaneously achieving post-combustion of the gases from the roasting and of the particles with a size of less than the predetermined diameter and of solid material fuels.

12. The biomass treatment installation according to claim 11, wherein the multifuel burner is connected to the granulation press so that the solid material fuels are roasted granules produced by the granulation press.

13. The biomass treatments installation according to claim 10, wherein an outlet of the combustion chamber is connected:
   to a reactor inlet so as to heat the heating means at the roasting temperature with the post-combustion gases;
   or to an inlet of the reactor to inject the post-combustion gases at the roasting temperature, into the reactor chamber;
   or to the heat exchangers formed by fins of heat pipes so that energy for heating a heat transfer fluid of the heat pipes is provided by the post-combustion gases.

14. The biomass treatment installation according to claim 13, further comprising an additional heat exchanger, distinct from the heat exchangers of the heat pipes, a hot fluid circuit of which is connected to the outlet of the combustion chamber and a cold fluid circuit of which is connected to a dryer configured to apply the biomass before being fed into the reactor, to provide energy for heating the dryer by the post-combustion gases.

15. The biomass grinding and roasting reactor according to claim 1, wherein a portion of the one of the heat piping elements extends beyond an end of the central rotary shaft and includes fins mounted on the portion of the one of the heat pipe elements to form a heat exchanger.

16. The biomass grinding and roasting reactor according to claim 1, wherein the liquid in the one of the heat piping elements is naphthalene.

* * * * *